Nov. 2, 1965   S. E. SHELDON ETAL   3,215,438
HIP MOVEMENT TRAINING DEVICE FOR GOLFERS
Filed Dec. 22, 1961   8 Sheets-Sheet 1

INVENTORS
SAMUEL E. SHELDON
DAVID J. LEVINSON

*INVENTORS*
SAMUEL E. SHELDON
DAVID J. LEVINSON

Nov. 2, 1965  S. E. SHELDON ETAL  3,215,438
HIP MOVEMENT TRAINING DEVICE FOR GOLFERS
Filed Dec. 22, 1961  8 Sheets-Sheet 3

INVENTORS
SAMUEL E. SHELDON
DAVID J. LEVINSON

INVENTORS
SAMUEL E. SHELDON
DAVID J. LEVINSON

INVENTORS
SAMUEL E. SHELDON
DAVID J. LEVINSON

Nov. 2, 1965  S. E. SHELDON ETAL  3,215,438
HIP MOVEMENT TRAINING DEVICE FOR GOLFERS
Filed Dec. 22, 1961  8 Sheets-Sheet 6

INVENTORS
SAMUEL E. SHELDON
DAVID J. LEVINSON

Nov. 2, 1965  S. E. SHELDON ETAL  3,215,438
HIP MOVEMENT TRAINING DEVICE FOR GOLFERS
Filed Dec. 22, 1961  8 Sheets-Sheet 7
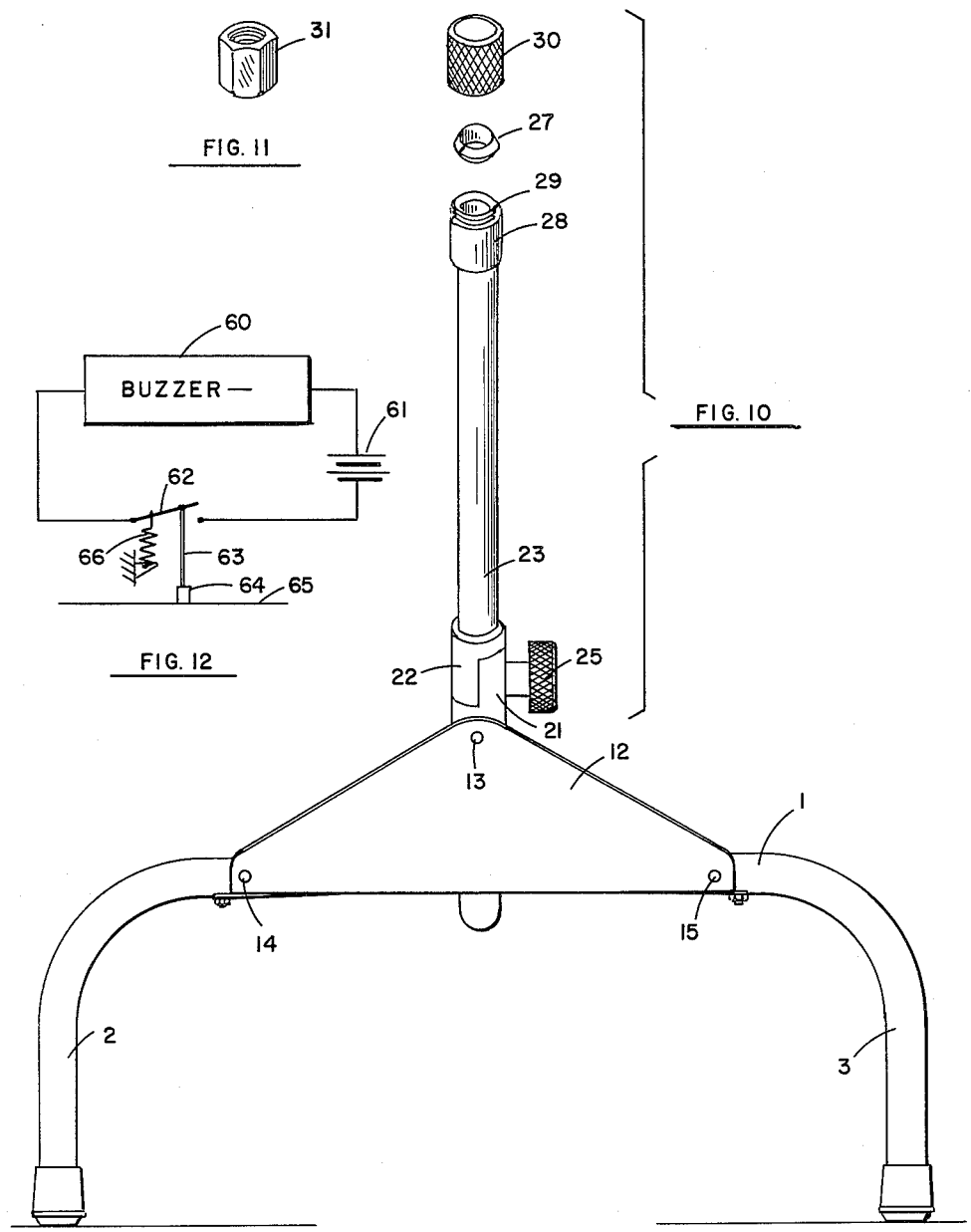
INVENTORS
SAMUEL E. SHELDON
DAVID J. LEVINSON

INVENTORS
SAMUEL E. SHELDON
DAVID J. LEVINSON

United States Patent Office 3,215,438
Patented Nov. 2, 1965

1

3,215,438
HIP MOVEMENT TRAINING DEVICE FOR GOLFERS
Samuel E. Sheldon, 2904 141st Place, Gardena, Calif., and David J. Levinson, 3333 W. 4th St., Los Angeles, Calif.
Filed Dec. 22, 1961, Ser. No. 161,489
3 Claims. (Cl. 273—188)

The invention herein described pertains to golf instruction equipment, and more particularly to apparatus that drills the user in acquiring correct pivoting form and warns him when he has erred.

Certain devices have been available in the past that were intended to teach correct pivoting form, but many of these have had to be strapped to the person receiving the instruction, and none has given warning when there has been a departure from correct form excepting for one that gave a warning signal in case of a movement of the head. Moreover, most of the instruction devices in the past have made it virtually impossible for the user to vary his movements from the definite path in which the device restrains him, and he has thus had no feeling of freedom. The instant device allows full freedom of bodily movement, but gives a warning signal if there is a departure from correct form.

Previous equipment has been cumbersome and required dismantling whenever the user desired to move the apparatus from one location to another. Apparatus embodying the present invention may be collapsed and folded.

Our teaching device is intended to drill the golfer in acquiring proper stance and proper address to the ball and to teach him a perfect pivot and swing, and repeated practice with the device causes the player's controlled movements to become so habitual that "muscle memory" takes over when he is on the golf course. Inasmuch as the equipment warns the golfer of deviations from proper form, he learns to keep a proper balance, to acquire a proper wind-up of the trunk of the body, to avoid jerky or irregular movements detracting from a smooth swing.

Some of the specific objects of our invention are:

To provide guidance apparatus that may quickly be yieldingly clamped to the golfer's hips and that will permit free pivotal movement of the wearer.

To afford a design that permits ready adjustment of the apparatus for users of all heights, breadths, and weights.

To make it possible for the golfer instantly to snap the clamping means to an open position so that he may step out of the device without unfastening anything and without disturbing adjustments that may have been made to fit the apparatus to the individual user.

To provide an alarm that warns the golfer when his pivot is faulty or when he has varied from proper form in other respects.

To supply the alarm system with means whereby the particular pitch of the signal will give some information regarding the nature of the golfer's error.

To provide a device of the class described that may be readily collapsed and folded for easy transportation.

To supply a structural form that will give the apparatus a broad base that will at no time restrict the movement of the golfer's legs or feet.

To provide a device of the class described that will be sturdy and durable and economical to manufacture.

In the drawings:

FIGS. 1, 2 and 3 show in general the way our device is attached to the user and the different positions that its various parts assume as the golfer begins his swing, is about to address the ball, and finally as he completes his stroke. In order to show the details of the apparatus as clearly as possible, the parts that would be obscured by

2 the wearer if the apparatus were shown actually attached to the body, the wearer has been shown in phantom, and instead of making it appear that the apparatus were actually being worn by the person in these figures, an attempt has merely been made to show the general orientation that the various parts assume when the device is attached to a pupil and when his body is in the general positions illustrated in the figures.

FIG. 10 is a partially exploded view of one form of pedestal and upright for a structure embodying our invention.

FIG. 11 is a hexagonal adjusting nut suitable for replacing the round adjusting nut shown at the top of the exploded view of FIG. 10.

FIG. 12 shows the circuitry and adjustable features of the components used in one form of signal device that may be used in equipment embodying our invention.

Figure 1:
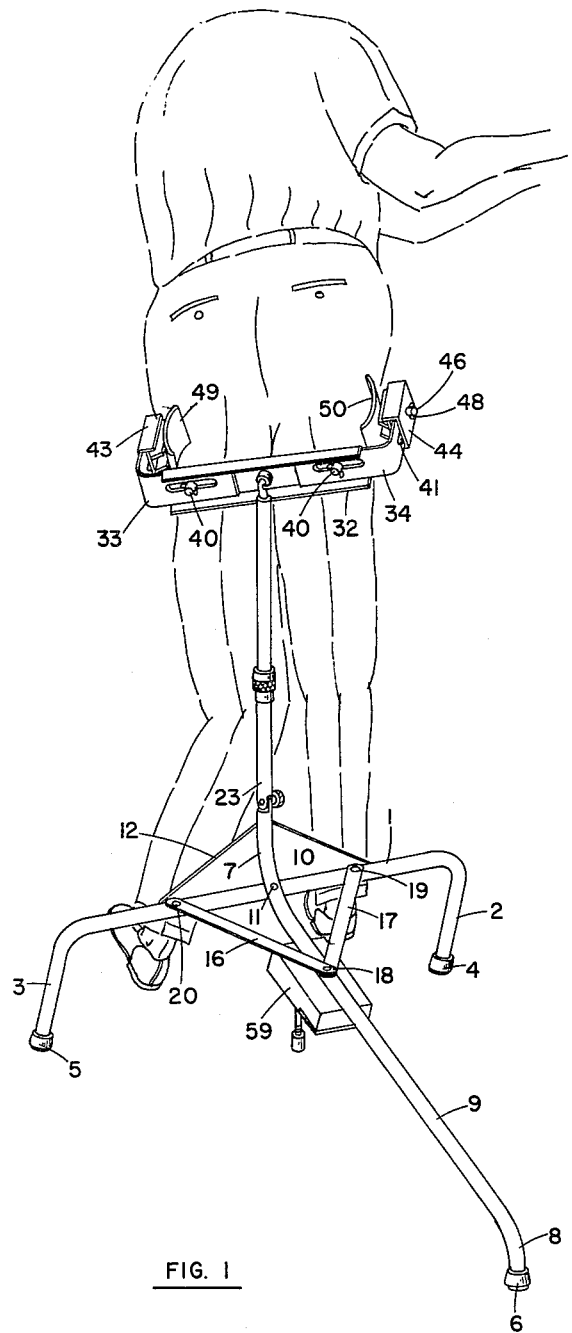

Although the pedestal of the embodiment of our invention that we presently prefer could conceivably have any number of feet or legs in excess of two, a tripod arrangement seems preferable, and we have therefore designed the compact, simple and rugged arrangement well illustrated in most of the figures, but particularly in FIGS. 1, 3, 4, 5 and 10. Two of the legs are formed preferably from a hollow elongated member bent down at the two ends to form two legs, 2 and 3, and a horizontal center section 1. A second preferably hollow elongated member is bent up at one end and down at the other to form an upwardly extending section 7, a downwardly extending third leg 8, and a long central section 9. This second elongated member is bolted, riveted, welded or otherwise appropriately attached near the juncture of the central section 9 and the upwardly extending section 7 to the central horizontal section 1 of the first elongated member. A rivet 11 is shown in some of the figures as appropriate means for joining these two components of the pedestal assembly.

The upwardly extending arm 7 of the base structure may be braced from two sides by a triangular member such as piece 12, which is fastened to arm 7 by means of a bolt 13 and to the horizontal beam 1 by means of screws 14 and 15. Further bracing is provided by struts 16 and 17, both shown fastened to the central section 9 of the third leg of the pedestal by bolt 18. The other ends of struts 16 and 17 are connected respectively by bolts 19 and 20 to the cross member 1. Crutch tips 4, 5, and 6 are placed on the ends of the three legs.

The upper end of arm 7 is capped by member 21, which is cut away on one side in an axial plane so that it may mate with a similar or identical member 22 rigidly attached to the lower end of the tube 23. Member 22 is rotatable on a short shaft 24 having an enlarged outer end. Member 21 and 22 may be keyed in any of a variety of ways so that they will mesh or dovetail together at least when the tube 23 is in an upright position such as that shown in most of the figures or in an angular position as illustrated in broken lines in FIG. 5. The bolt 24 may be threaded at its right end as viewed in FIG. 13 for threaded engagement by female threads provided in the knurled nut 25. The tightening of nut 25 on the threaded member 24 clamps members 21 and 22 together, but in view of the keying provisions, it is not necessary to depend solely upon friction to hold the members in the desired relative angular positions. The keying means is not described nor shown in detail for the reason that a wide variety of keying arrangements are suitable for this purpose, and no specific means is essential. The keying arrangement thus forms no part of this invention per se.

A round rod 26 telescopes inside of the tubular member 23 to vary the effective length of the upright to meet the requirements of golfers of different heights.

In order to clamp the rod 26 in adjusted position with respect to tube 23, a collet device may be provided on the top of the tubular member 23. This may appropriately consist of a split ferrule 27, FIG. 10, adapted to surround the shaft 26. The ferrule 27 is provided with sides that taper toward the top and bottom ends from the enlarged center section. The cylindrical member 28, which is rigidly attached to the top of tube 23, is countersunk at its upper end to receive the tapered lower end of the ferrule 27. Member 28 is provided with male threads 29 at its upper end to mate with corresponding female threads in member 30, which is counterbored to receive the upper tapered end of member 27 so that when the collar or nut member 30 is screwed down over member 28, it will by means of a cam-like action of the mating tapers, close the split ring or ferrule 27 so that it will grip tube 26. The hexagonal member 31 of FIG. 11 is provided with the same type of countersink and internal threads that are provided in member 30, and these two members may be used interchangeably, the hexagonal member being an alternative that permits tightening by means of a wrench.

The collet arrangement is not described in further detail because it, like the clamping device used lower down on the upright, is likewise not a portion of the instant invention per se.

The generally horizontal seat member 32 must be free to pivot from side to side around the upright portion of the stand. The variety of pivotal positions made possible by this arrangement will be apparent from a comparison of FIGS. 1, 2, and 3, each of which shows the seat-rest 32 in a different angular position with respect to the pedestal. It will be seen that considerable pivoting movement in a counterclockwise direction has taken place between the positions indicated in FIGS. 2 and 3.

We prefer to form the seat member 32 from a channel so that the side portions thereof may not only strengthen the member but serve as guides for the adjustable L-shaped members 33 and 34, later to be described.

In order to provide the required swivel connection between the seat-rest 32 and the upper portion of the upright, we attached a socket 35 by any appropriate means to the central portion of the seat-rest 32. A ball 36 is rotatably mounted in the socket 35 for rotation in all directions. An internally threaded cap 37 is rigidly affixed by any convenient means in the top end of the rod or tube 26, FIG. 9, and the ball 36 likewise has internal threads. An angled member 38 is appropriately threaded at both ends for engagement with the female threads in the ball 36 and in the cap 37 for rigidly connecting the ball 36 to the cap 37.

Figure 2:
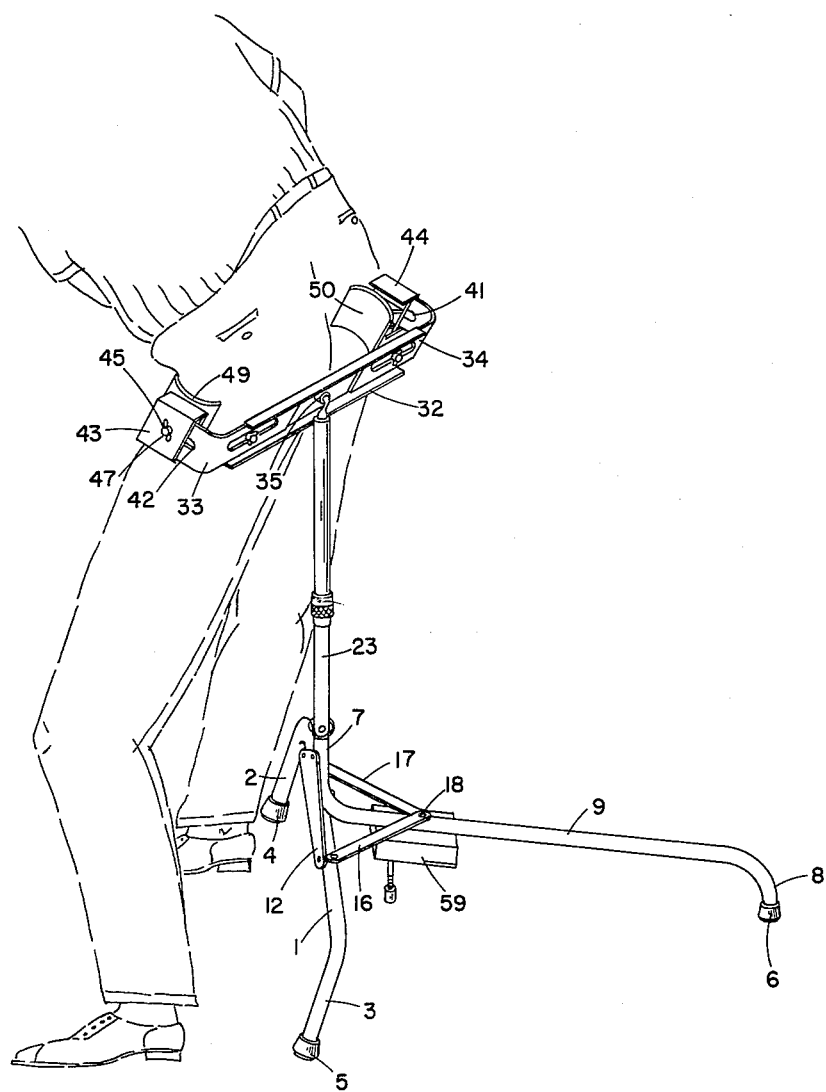
Figure 3:
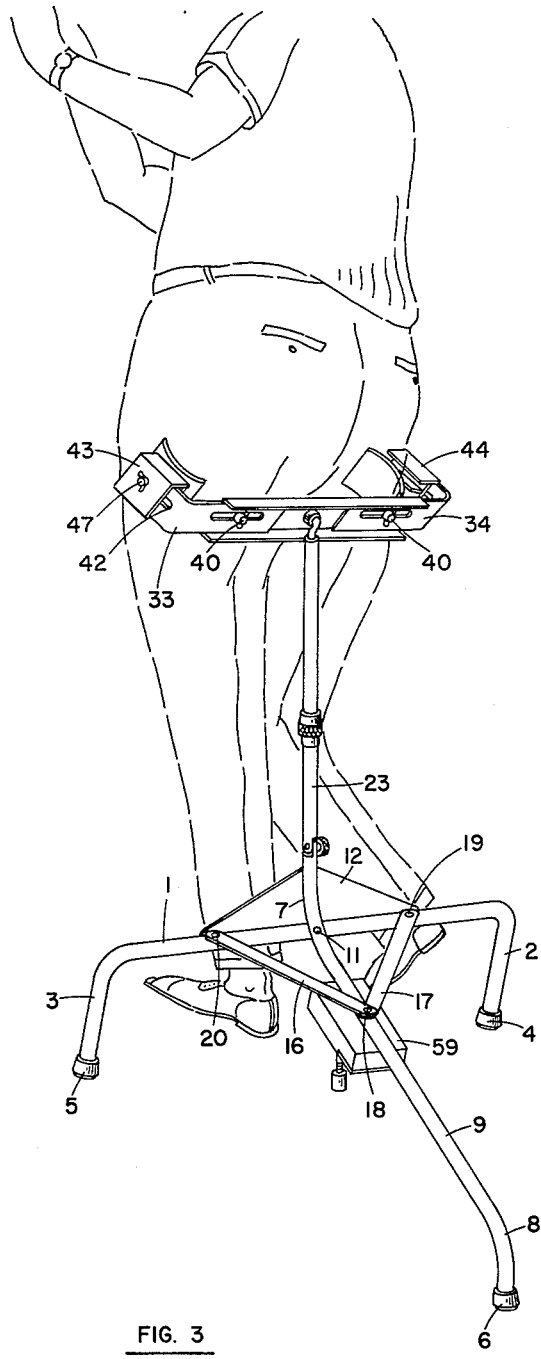

The engagement of the side of the angled linking member 38 with the edge of the opening in the socket of course limits the angular movement of the seat-rest 32 with respect to the upright member 26; in fact, the ball and link may be so oriented with respect to each other that the entire assembly, comprising the seat-rest 32 and other components attached thereto, will normally assume the general angular position with respect to the upright that is illustrated in FIGS. 1, 2 and 3. When appropriately yieldingly clamped on the golfer, this angular position of the harness with respect to the upright assists in urging the golfer's body toward a proper stance.

One arm of each of the generally L-shaped members 33 and 34 is slotted as shown in FIGS. 1, 2, 3 and 8, to receive a bolt 39 that is anchored in the seat-rest 32. Wing nuts 40 are threaded on these bolts, and they may be tightened against the portions of members 33 and 34 that adjoin the slots therein. This structure makes it possible, when the wing nuts 40 are loosened, to move the L-shaped members 33 and 34 longitudinally with respect to the seat-rest 32 in order to provide any desired spacing between the other ends of the L-shaped members 33 and 34 that extend outwardly from the seat-rest. These are arranged substantially parallel to each other to permit positioning them against opposite sides of the golfer who is using the equipment.

The opposed arms or sides of members 33 and 34 are likewise slotted as indicated by slot 41 in member 34 in FIG. 1 and by slot 42 in member 33 in FIG. 3. Both of these slots are visible in FIG. 2.

The channel members 43 and 44 are slidably movable along the parallel arms of members 33 and 34, respectively. Bolt 45, FIG. 2, is inserted through slot 42 and then passed through a hole in channel 43, and a wing nut 47 is then threaded onto the bolt. As member 43 is moved back and forth along the perpendicularly extending arm of member 33, bolt 45 of course slides within the slot, and member 43 may be clamped in an adjusted position by means of wing nut 47. Bolt 46 likewise extends through the slot in member 34 and then protrudes through a hole in the back of member 44 to receive a clamping wing nut 48.

The crescent-shaped members 49 and 50 form the side clamps that grip the hips of the user of the device.

Figure 4:
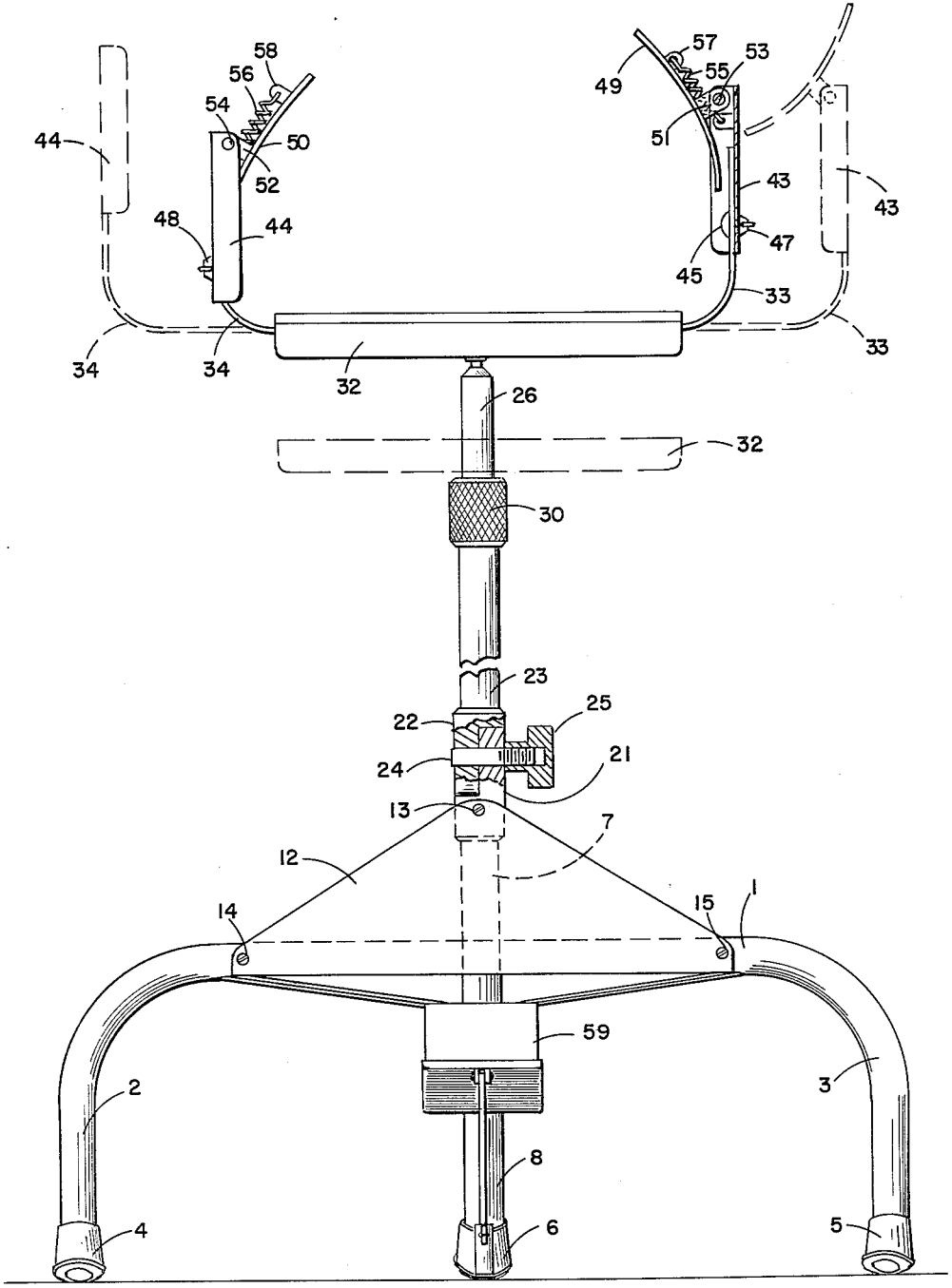
FIG. 4 is a plan view of our device illustrating certain adjustments of which it is capable.
Figures 5, 7, 9:
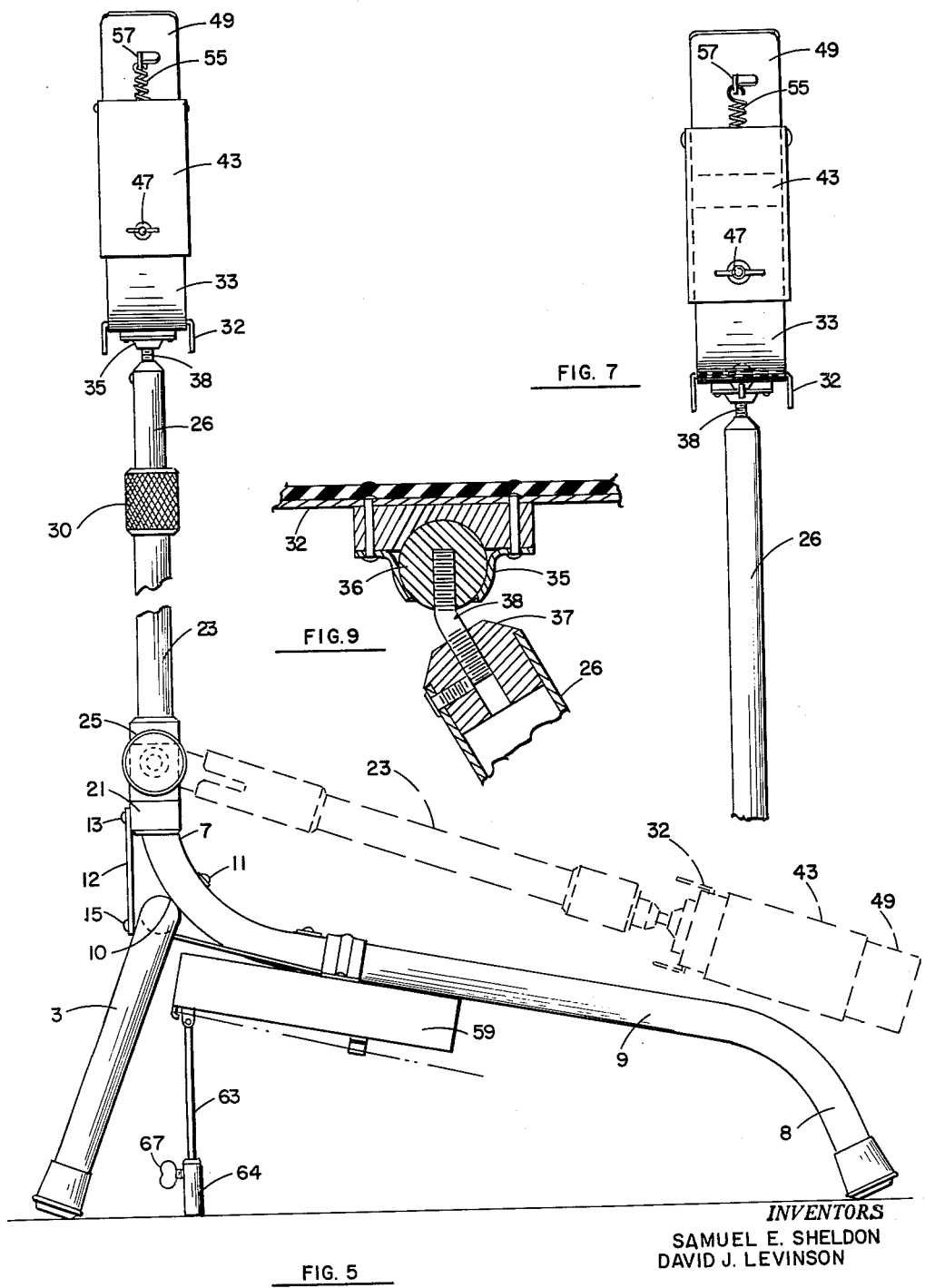
FIG. 5 is a side elevation of the apparatus shown in FIG. 4, revealing various structural features of the pedestal and illustrating in phantom the general arrangement of the parts when the upright is folded down for easy portability.
FIG. 7 is a side elevation of the parts shown in FIG. 6.
FIG. 9 is a detailed cross-sectional view of the ball and socket connection of the harness portion of the mechanism to the top of the pedestal proper.
Figure 8:
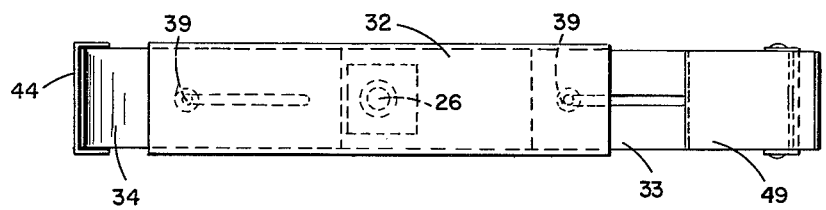
FIG. 8 is a top view of the portions of the apparatus shown in FIG. 6.
Figure 6:
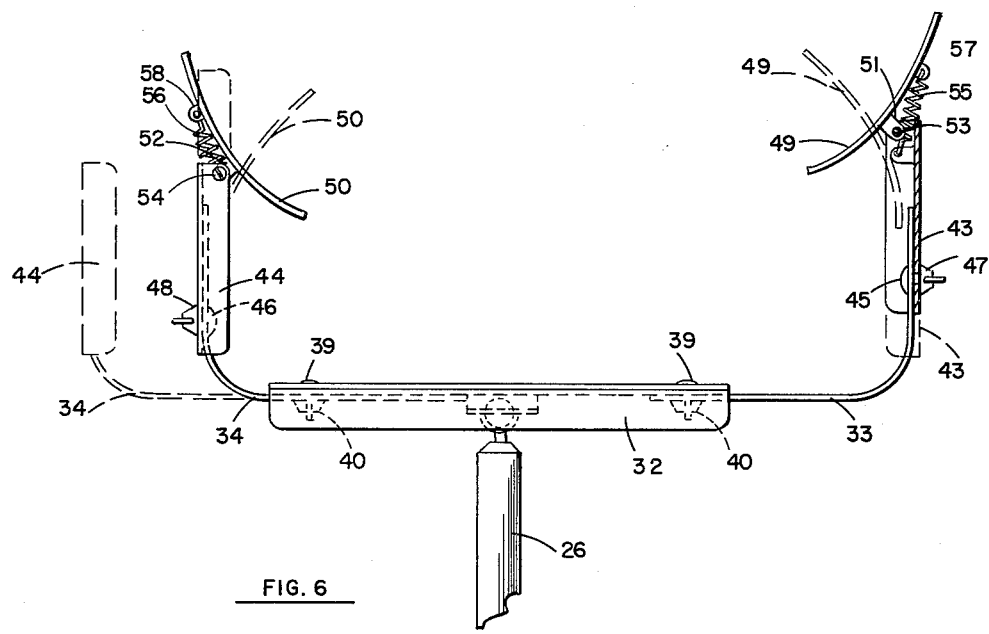
FIG. 6 is a detailed view of the "harness" portion of our device, showing some features of its adjustment — particularly of the parts that are to be yieldingly clamped to the body.

Member 49 is provided on opposite edges with a pair of parallel lugs 51, FIGS. 4 and 6, that protrude outwardly from the convex side of the member. The crescent-shaped clamp 50 likewise has a pair of lugs 52 that protrude from the back thereof. These pairs of lugs are pivoted respectively on bolts 53 and 54 in the associated channel members 43 and 44.

Members 49 and 50, pivoted by means of their respective pairs of lugs, are spring loaded toward the clamping positions shown in FIGS. 1, 2, 3 and 4. This is done by means of extension springs 55 and 56, FIGS. 4, 5, 6 and 7, attached respectively to lugs 57 and 58 formed on the convex sides of the crescent members 49 and 50. The extension springs 55 and 56 extend along the back convex sides of these members between the backwardly projecting lugs, and the other ends of these springs are attached to the channel members as illustrated in FIG. 4 where the lower end of spring 55 may be seen anchored between the parallel sides of channel member 43. Inasmuch as the two ends of spring 55 both lie on the same side of the pivot screw 53, the effort of the spring to assume the shortest path between the anchor points of its two ends, results in the crescent member being urged to the position shown in full lines in the figure. What has been said with respect to spring 55 attached to the crescent member 49, of course, applies in like fashion with respect to spring 56 and crescent member 50.

If either of the crescent members is rotated backwards towards the position shown in full lines in FIG. 6, the spring will flip to the opposite side of the axis on which the lugs attached to the crescent member are pivoted. This condition may be seen in FIG. 6 where spring 55 is shown extending along the inner side of member 43 and assuming a rather straight position removed from the convex side of member 49. The toggle-like action of these crescent clamps and their respective loading springs, causes the crescent member to be urged to the particular extreme position toward which it is moving as the loading spring passes across the pivotal axis. When the crescent side members have been flipped to the "open" positions, the golfer may step from between them without disturbing any of the adjustments of the equipment.

It should be clear from the foregoing description that our instruction device or jig may be adjusted to fit any golfer whose height and general proportions are within the normal range, and that when the channel members 43 and 44 are moved toward each other in the initial process of adjusting them for the specific wearer, the crescent members 49 and 50 may be made to yieldingly grasp the wearer's hips. It should also be clear that if the hips pivot around the upright portion of the device in a generally uniform plane, all three of the legs of the pedestal will remain in contact with the ground or other surface on which it may be resting, but that if the golfer moves too far to one side, raises up beyond the normal position, or stoops too low, one or other of the legs of the device will be lifted from the supporting surface. Any such disengagement of one of the feet with respect to the supporting surface is of course an indication that the golfer has departed from the smooth pivotal path in which he is endeavoring to train himself to move. We therefore provide a warning signal that will produce an audible sound whenever any one of the feet of the pedestal is raised by a preselected distance from the surface on which it normally rests.

FIGS. 1, 2, 3 and 4 show our signaling device attached to the rear leg 9 of the pedestal structure. This device comprises the components shown diagrammatically in FIG. 12. These components include a buzzer 60, a current source 61, a switch 62, electrical conductors to connect these components in series, and a plunger 63 appropriately connected to the switch and having a longitudinally movable end 64 for varying the effective length of the plunger. If all of the components shown schematically in FIG. 12 were to be lifted bodily from the surface 65, it will be seen that the weight of the plunger 63 and its adjustable end 64 would cause the switch to close, resulting in the buzzer being energized. To assure the proper operation of this switch, we prefer not to rely solely upon gravity for its operation, but to provide a loading spring 66 of sufficient strength to overcome any friction that might prevent its responding to the action of gravity alone.

Our signal device may be adjusted so that it will be actuated merely by a slight variation of the golfer from a smooth pivotal stroke, or so that a considerable variation may be required for its actuation. This is done by loosening the wing screw 67, FIG. 5, and moving the tip portion 64 longitudinally along the plunger 63 to the position that will give the plunger assembly the specific effective length that will cause it to actuate the switch when one or other of the legs of the tripod has been raised a specific predetermined distance from the supporting surface. For example, the user of the device could place his thumb under one or other of the crutch tips on the legs of the tripod and then move the plunger 63 just far enough into the tip 64 to cause the buzzer to sound. After tightening the wing screw 63 and removing his thumb from under the crutch tip, it will be seen that the plunger will be pushed upward to a position in which the contacts of the switch will become disengaged. If the hip clamps are attached to the golfer's person, it will be obvious that whenever a deviation in his pivotal swing causes one of the feet of the pedestal to move upward a distance equal to the thickness of his thumb, the signal will sound. If he desires a more discreet adjustment to warn him of a lesser deviation from a perfectly "grooved" stroke, he might use his little finger or some other object for determining the distance that one of the legs of the tripod would need to be raised in order to actuate the alarm.

Figure 14:
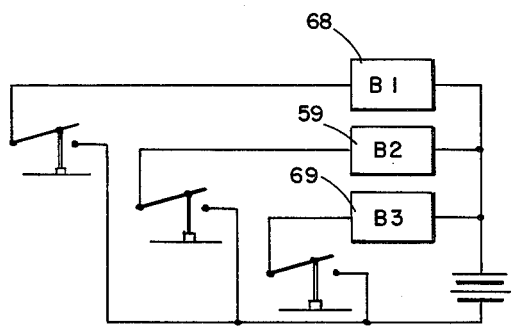
FIG. 14 is a schematic arrangement similar to that of FIG. 12, but illustrating modifications required for the embodiment shown in FIG. 13.
Figure 13:
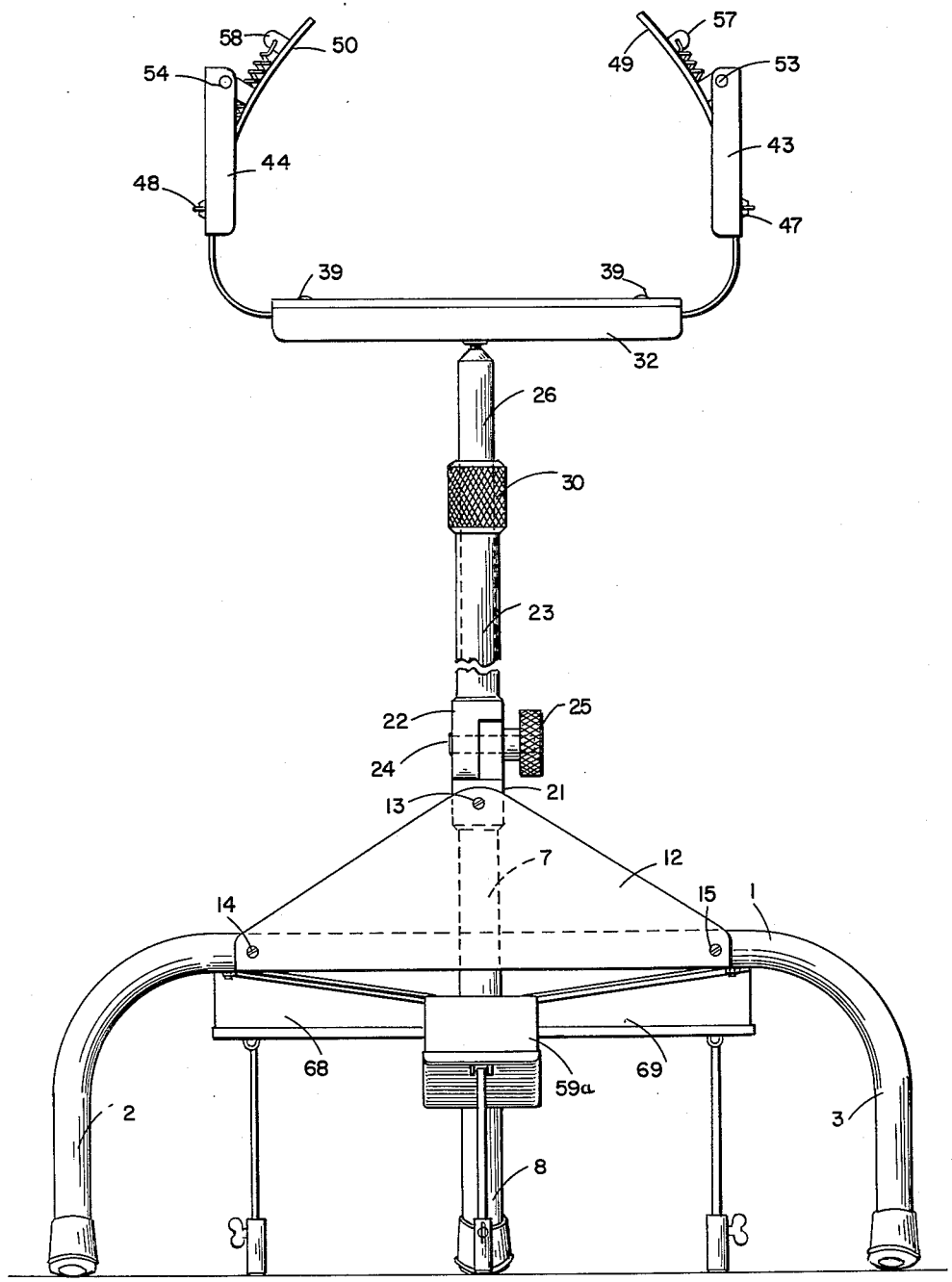
FIG. 13 is a front elevation of an embodiment of our invention in which separate means are provided for each of the three feet of the pedestal to warn the user that the associated leg of the apparatus has been raised from the surface on which the other two legs are resting.

In FIG. 13, we show three signal devices each connected to a different leg of the pedestal. These, of course, may be adjusted to respond first to a given movement of the respectively associated leg before causing a response from either of the other two buzzers. In order to advise the pupil as to the specific way in which he has varied from a proper swiveled stroke, we provide each of the three signal devices 59a, 68 and 69 with a buzzer having a pitch different from that of the other two. The three signal devices may be entirely independent of each other electrically, or they may all have a single current source as indicated in FIG. 14. Instead of merely placing each lunger *near* the leg with which it is associated, it will be obvious that the plunger could be journaled inside the leg and connected by appropriate linkage or other means to the associated actuating switch.

Numerous other variations may of course be made from the embodiment of our invention shown for illustrative purposes in the accompanying figures and described in the specifications of this disclosure. Substitutions may be made for any of the elements set forth in the appended claims, and parts may be combined, transposed and rearranged, or replaced by other components performing the same functions without departing from the broad spirit of our invention as indicated in the combinations hereinafter claimed.

What we claim is:

1. In a golf instruction device, a combination including: a pedestal comprising an upright member; a cross member pivoted intermediate its ends to the top of said upright member; a pair of generally L-shaped members each having one side slidably attached to a different leg of said cross member; fastening means for holding said L-shaped members in adjusted position; and a pair of clamping instrumentalities for grasping the user's hips, each of said instrumentalities comprising a supporting element longitudinally adjustably mounted on the free arm of a different one of said L-shaped members, an elongated element having a pair of opposed lugs extending therefrom intermediate its ends, said lugs pivoted to the supporting element, and a coiled extension spring disposed generally parallel to said elongated element and passing between said lugs, one end of said spring attached to said supporting element and the other to the elongated element for yieldingly holding the elongated element against the hip of the user.

2. In a golf instructon device, a combination including: a pedestal comprising an upright member; a cross member pivoted intermediate its ends to the top of said upright member; a pair of generally L-shaped members each having one side slidably attached to a different leg of said cross member; fastening means for holding said L-shaped members in adjusted position; and a pair of clamping instrumentalities for grasping the user's hips, each of said instrumentalities comprising a supporting element longitudinally adjustably mounted on the free arm of a different one of said L-shaped members, an elongated element having a lug extending perpendicularly therefrom intermediate its ends, said lug pivoted to the supporting element, and a coiled extension spring disposed generally parallel to said elongated element and passing said lug, one end of said spring attached to said supporting element between the point at which said lug is pivoted thereto and the side of said member that is slidably attached to a leg of the cross member, and the other end of the spring attached to the elongated element at such location thereon that the spring will alternatively lie on either side of the pivotal axis of said lug to selectively urge the elongated element either to a first angular position against the hip of the user or to a second angular position in which the element is urged away from said hip.

3. In a golf instruction device, a combination including: a pedestal comprising an upright member; a cross member pivoted intermediate its ends to the top of said upright member; a pair of generally L-shaped members each having one side slidably attached to a different leg of said cross member; fastening means for holding said L-shaped members in adjusted position; and a pair of clamping instrumentalities for grasping the user's hips, each of said instrumentalities comprising a supporting element longitudinally adjustably mounted on the free arm of a different one of said L-shaped members, a crescent-shaped element having a lug extending perpendicularly from its convex side intermediate its ends, said lug pivotally attached to said supporting element, and a coiled extension spring disposed longitudinally along the convex side of said supporting element and passing said lug, one end of said spring attached to said supporting element and the other to the elongated element for yieldingly holding the crescent-shaped element against the hip of user.

References Cited by the Examiner
UNITED STATES PATENTS

| | | | |
|---|---|---|---|
| 925,645 | 6/09 | Molz | 128—109 |
| 1,457,710 | 6/23 | MacDonald | 273—183 |
| 1,561,960 | 11/25 | Ungar | 273—188 |
| 1,936,143 | 11/33 | Shea | 273—190 |
| 1,940,904 | 12/33 | Dayton et al | 128—78 |
| 2,469,301 | 5/49 | Johnston | 273—188 |
| 2,611,610 | 9/52 | Hara | 273—183 |
| 2,980,376 | 4/61 | Westerfield | 248—44 |
| 3,074,771 | 1/63 | Wilson | 248—164 |

FOREIGN PATENTS

| | | |
|---|---|---|
| 212,168 | 3/24 | Great Britain. |
| 957,865 | 8/49 | France. |

DELBERT B. LOWE, *Primary Examiner.*